Sept. 10, 1935.  R. F. KUNS  2,013,890
TRAILER CHASSIS
Filed Nov. 6, 1933
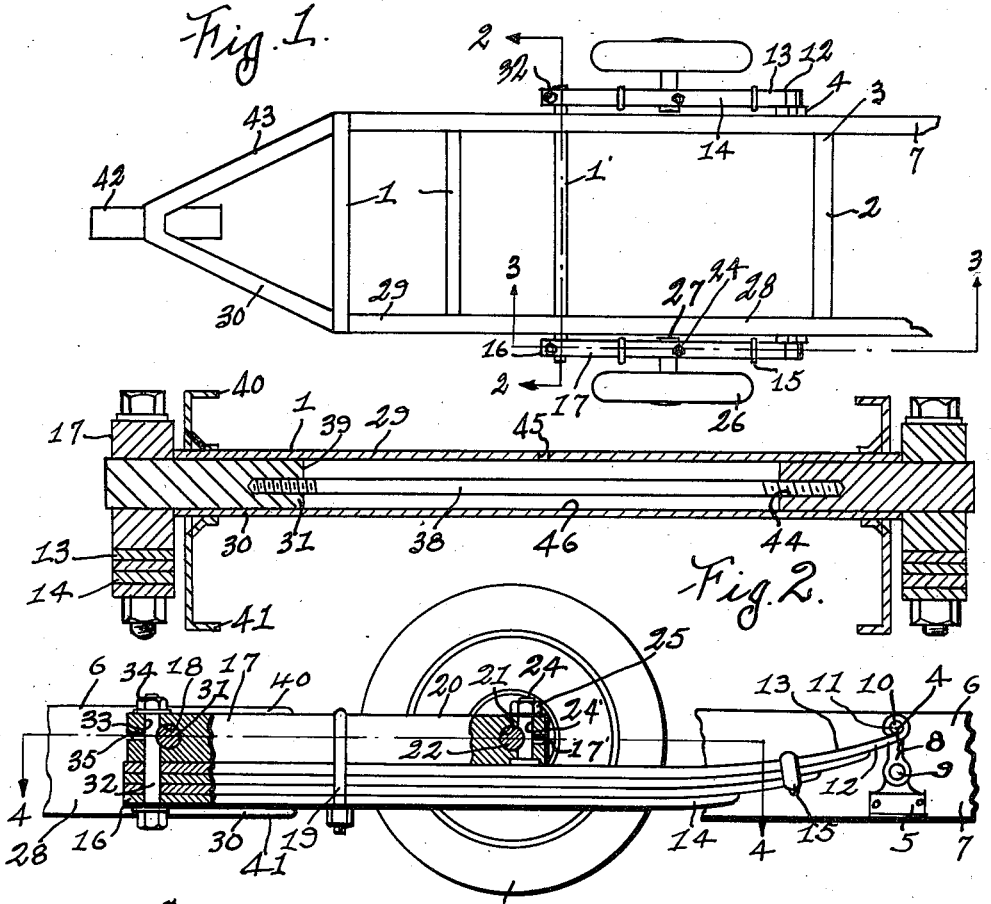
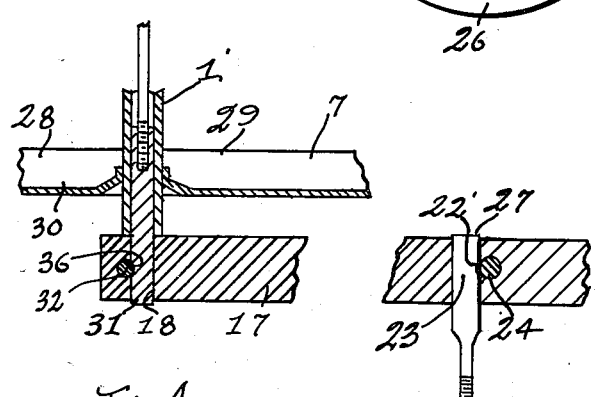
INVENTOR.
RAY F. KUNS
BY
ATTORNEY.

Patented Sept. 10, 1935

2,013,890

UNITED STATES PATENT OFFICE 2,013,890

TRAILER CHASSIS

Ray F. Kuns, Madisonville, Ohio

Application November 6, 1933, Serial No. 696,827

9 Claims. (Cl. 267—19)

The invention relates particularly, but not exclusively, to spring and frame construction of two wheel motor vehicle trailers adapted for use by tourists, campers, farmers, stockmen, dairymen, expressmen, and others having use for a vehicle having a low center of gravity with springs mounted independently of each other.

Heretofore, considerable difficulty and inconvenience has been experienced by tourists, campers, farmers, stockmen, merchants and others who travel in automobiles and desire to carry such equipment as campers' outfits or merchandise or freight on vehicles being pulled over the highways. This is true because trailers, whose springs are mounted on an axle which extends transversely of the frame, has a high center of gravity whereby when carrying considerable weight and traveling at high rates of speed they are a continuous source of danger to the occupants of the towing vehicle as well as all other drivers and occupants of various vehicles on the highways.

Particularly for these and many other important reasons it is highly desirable to provide a trailer having a low center of gravity so that its load may be as low as is consistently possible, considering average conditions of highways, for the purpose of preventing the trailer from weaving excessively or upsetting when an automobile tows it around curves and over rough or crowned roads.

Moreover, it is important that the body and load of a camping trailer are low, because the floor of the camping trailer chassis is adjacent the ground and only one step is required by a user to climb from the ground into the stationary trailer when it is being utilized as living quarters, or freight may be loaded into the trailer without necessity of lifting it a great distance from the ground.

Also, it is important to have a compact and relatively short spring construction which provides easy riding quality, and a mounting of said springs with respect to the trailer frame which is durable and efficient in operation, as well as economical from the standpoint of construction cost.

Therefore, the general object of the invention is to provide a simple, efficient and durable trailer, having independently mounted wheels, and having a relatively low center of gravity whereby the bottom of the trailer body is relatively close to the upper surface of the ground over which it travels; and to provide a relatively short or compact spring construction which assures easy riding quality of the vehicle.

Other objects of the invention are to provide means whereby the torque or twist imparted to the saddle blocks by the bending moment of the wheel and tube spindles, which resist the load weight and road shock, is adequately compensated for by means of the inherent strength of the materials used for the construction of the saddle block, tube, tube spindles and wheel spindles. A further object of the invention is to provide a saddle block to properly permit the vertical movement of the chassis and trailer body in relation with the wheel spindle, and at the same time confine the wheel spindle and the movement thereof in predetermined spaces and relationships; to provide simple and practical means whereby quick upward movement of the springs of said trailer is prevented; to provide means whereby the movement of the respective springs is free and unrestricted; and to provide a simple and efficient mounting of said springs with respect to the trailer frame.

Other objects of the invention will be apparent by reference to the drawing, the hereinafter description, and the claims.

The invention consists in the combination of the elements, arrangement of the parts and in the details of the construction, as hereinafter claimed.

In the drawing:

Fig. 1 is a plan view of a trailer, with parts broken away, showing the invention incorporated therewith;

Fig. 2 is a section taken on a line corresponding to 2—2 in Fig. 1;

Fig. 3 is a section taken on a line corresponding to 3—3 in Fig. 1, with parts shown in side elevation; and Fig. 4 is a section taken on a line corresponding to 4—4 in Fig. 3, with parts broken away and parts removed.

In the preferred construction of the invention I provide the front cross members 1 and the rear cross member 2. The cross members are arranged in parallel and spaced apart relation to each other, and the tubular cross member 1' is parallel with and intermediate the members 1 and 2.

Fixed adjacent each end 3, of the rear cross member 2, is the usual spring shackles 4. Each shackle comprises the usual base 5 which is fixed, as by rivets, to the perpendicular leg 6 of the channel 7 from which the frame side member is formed.

The link 8 of the shackle has its lower end pivotally mounted on the lug 9 which is integral with the base 5. The upper end of the link 8 has a hole therein in which is rotatably mounted the shackle bolt 10 which, also, is pivotally mounted in the hole 11, formed in the upwardly curved rear end 12 of the master or top leaf 13 of the usual one-quarter elliptic spring 14, having secured therearound the usual spring clip 15 for the purpose of retaining the leaves of the spring in aligned position.

Secured to the top of the master leaf 13, and positioned at the front end 16 of the spring 14, is the saddle 17 shown in Figs. 1, 2 and 3 as being longitudinal and having in its front end the hole 18, whose walls extend horizontally. The U-shape saddle bolt 19 is combinedly received around the intermediate portion of the saddle and the front end of the spring for the purpose of retaining the portion of the spring forward of the bolt 19 in fixed and immovable relation with the saddle.

In the rear end 20 of the saddle 17 is the hole 21 whose walls extend horizontally. Received in the hole 21, of the saddle 17, is the wheel spindle 22. The inner end 23 of the spindle 22 has a notch 22' therein and is retained in fixed position, with respect to the saddle block, as by the bolt 24 which is received in the hole 24' in the saddle block. The walls of the hole 24' extend vertically. Tightening the nut 25 draws the rear end of the saddle, which has the split 17' therein, in close contact with the spindle 22, and also the bolt 24 being received in the notch 22' prevents movement of the spindle 22.

Suitably mounted on the outer end of the wheel spindle 22 is the usual wheel 26. The inner ends 27 of the wheel spindles are positioned outwardly from a vertical plane taken through the outer surface of the channel 7 of the frame side 28 of the chassis 29 and a body which may be suitably secured to the cross members 1 and 2 of the chassis, of the trailer 30.

Therefore, unrestricted vertical movement of the body is permitted without chance of the body being contacted by the inner ends of the spindles. Moreover, the horizontal floor line of the body may be positioned in close proximity to the ground, in consideration of the average condition of highways, since the space between the wheels is unobstructed by a transverse axle or other mechanism.

Received in the hole 18 of the saddle is the stub shaft, axle tube spindles, or studs, 31 which are fixed to the saddle as by the vertical bolt 32 received in the hole 33 in the saddle. Tightening of the nut 34 draws the front end, which has the split 35 therein, in close frictional contact with the stud 31. Also, the studs 31 have the notch 36 in their sides in which the bolt 32 fits. The inner end of the axle tube spindle, or stud, 31 is received in the end 37 of the axle tube 1' and rotates in the tube. The stay bolt 38 is received between the inner ends 39 of the tube spindles 31 and is threaded thereto to retain the tube spindles in their bearing position within the tube 1'. The outer ends of the tube 1' are received through the legs 6 of the channels 7, comprising the vertical leg 6 and the horizontal legs 40 and 41.

The tow bar 42 is suitably fixed to the V-shape tow member 43 which is connected with the longitudinal side channels 7. The tow bar may be suitably connected as by a usual coupler with the rear end of a motor vehicle utilized to transport or pull the trailer.

The two tube spindles or studs 31, received in the tube 1' from either end carry the saddle block 17 which receives the twisting and bending moment induced by normal load weights transmitted from the chassis and received and resisted by the wheel, the wheel spindle, the saddle block and the tube spindle.

Threads are provided in drilled and tapped holes 44 in the inner spaced apart ends of the studs 31 and on the ends of the stay bolt 38 which threaded unions effect the retention of the studs 31 in normal operative position within the tube 1', whereby the differential oscillation action which occurs between the studs 31 and the stay bolt 38 is compensated for by the free running fit of the threaded stay bolt ends with the inner ends of the studs 31. The oil hole 45 in the tube 1' permits filling the chamber 46 with oil to insure proper lubrication of the parts within the tube.

An advantage of the invention is that the studs 31 are retained in operative position by means of the threaded union of their inner ends with the outer ends of the stay bolt 38, thus effectually resisting the removal of the studs from the tube as is the tendency when the chassis is subjected to usual travel over all kinds of roads. Furthermore, the stay bolt 38 being threaded to the studs provides a desirable differential action particularly when the vehicle encounters uneven surfaces of roadways and one spring is deflected more than the other, thus imparting a greater rotating motion, through the spring carrying saddle block, to one of the studs 31 which carry the forward ends of the saddle blocks than is imparted to the other stud. The differential action thus provided prevents undue strain being thrown on the studs 31, as would be the case were a single through shaft used or were these studs joined rigidly. This differential action permits of true independent wheel springing since a heavy deflection of the springing arrangement on one side of the chassis has no direct influence on the action of the springing arrangement on the opposite side.

Another advantage of the invention is that the maintenance of alignment of the wheels under load strain is entirely dependent on the positive resistance to misalignment of the axle tube, the axle tube studs or spindles, the saddle blocks and the wheel spindles. The springs, mounted on said saddle blocks, serve only to bear the load of the chassis and the weight thereon. In other words, the axle tube spindles, or studs, are received in the axle tube whereby the torque imparted to the saddles 17, by the wheel spindles 22, is absorbed by the axle tube spindles without likelihood of the parts becoming distorted or strained, and the relative length of the axle tube spindles, or studs, enables the axle tube to securely retain the axle tube spindles, or studs, in rotatable relation and absorb the torque imparted thereto, by the usual movement of the wheel spindles and the saddles, whereby irrespective of the weight or load on the body the wheels are adapted practically to remain in vertical and parallel relation to each other. Moreover, the ends of the tube 1' contact the inner sides of the saddles 17 which prevents longitudinal movement of the tube 1'.

Another advantage of the invention is that adjustment of the U-bolts 19 forwardly or rearwardly lengthens or shortens the movable portion of the springs 14, whereby adjustment of the bolts 19 adjusts the springs for different weight loads which may be carried on the chassis to secure the greatest efficiency from the springs.

For instance, if an unusually heavy load is desired to be carried on the chassis 29, the bolts 19 may be moved rearwardly whereby the length of the springs from the rear ends 12 of the top leaf 13 to the bolts 19 is shortened and stiffened, and a greater load may be carried on the chassis without imparting undue strain to the springs. Moreover, it is well known that every spring operates at its greatest efficiency when carrying a predetermined load. Therefore, adjustment of the bolts 19 may be made to enable the springs 14 to function at their greatest efficiency for the respective loads being carried on the chassis.

Still an important distinction and advantage of the invention is that the operation of the springs 14 with respect to the saddles 17 provides a snubbing action. In other words, after crossing a bump or road depression the inertia of the rising body causes the springs to be released from its load and the springs main leaves 13 contact the rear bottom rear edge of the saddles 17. Therefore, when the rear end of the springs 14 are depressed, during ordinary travel of the trailer, their quick upward movement is slackened, since the tops of the master leaves 13 contact the lower edge of the rear end of the saddles 17 which prevents breakage of the springs, as well as acting as a snubber to increase and assure easy riding qualities of the body which is mounted upon the springs.

Another advantage of the invention is that the vertical movement of the springs 14 is free and unrestricted, and the springs may elongate or retract to absorb the road shocks from the wheel spindles, because the rear ends of the springs are pivotally connected with the spring shackles 4 and the front ends of the saddles 17 are fixedly connected with the rotatable axle tube spindles 31.

Another advantage of the invention is that the load carried by the trailer body, the weight of the body itself and the unsprung portions of chassis, are borne by the unified elements comprising the wheel spindles 22, the longitudinal saddles 17 and the axle tube spindles, or studs 31, whereby the wheels are maintained in perfect vertical positions and also eliminates the tendency of the trailer to weave, which increases safety to all users of the highways.

Another advantage of the invention is that the elimination of the usual through axle and the accomplishment of independent springing of the wheels results in a high degree of road clearance and at the same time allowing the floor of the trailer to be relatively close to the roadway.

Another advantage of the invention is the reduction of usual towing effort by having the tow bar indirectly connected with the springs. The towing power is divided between the two steel channel side frame members from which the power is imparted to the cross tube 1', thence to the tube spindles 31, thence to the saddle blocks 17, and thence to the wheel spindle thus eliminating much of the usual cause of shimmy, tramp, wobble and weave to which ordinary trailers are subjected. This construction results in eliminating all duties from the springs except that of load carrying and shock snubbing.

A further advantage of the invention is the prevision for lubrication through the oil hole 45, whereby the chamber 46, formed by the walls of the tube 1' and the inner ends of the studs 31, is more than ample size to contain a season's supply of lubricating oil, thus eliminating the necessity of frequent attention and lubrication of these parts.

A further advantage of the invention is the relatively great spring action secured within a limited space, said spring action being very much greater than would be indicated by the actual vertical movement of the chassis, with reference to the position of the wheel spindles, whereby effective cushioning against road shocks is provided while at the same time the actual vertical movement of the loaded vehicle body is relatively limited.

It is apparent that I have devised a novel and useful structure which embodies the features of advantages enumerated, and while I have, in the present instance, shown and described preferred embodiments thereof which will give in practice satisfactory and reliable results, it is to be understood that the same is susceptible of modification in various particulars. In other words, it is apparent that the parts of the invention may be of any size and constructed of any materials deemed convenient and suitable for an article of this character, and while I have illustrated and described a form of construction and arrangement of the elements found desirable in materializing the invention, I wish to emphasize the fact that I desire to include in this application all equivalents and substitutes that may fairly be considered to come within the scope and purview of the invention as defined in the claims.

What I claim as new and desire to secure by Letters Patent is:

1. The combination with a vehicle having a frame, a spring having its one free end movably connected with said frame, a saddle on the top of said spring, means fixing said saddle with said spring, a wheel spindle mounted on said saddle, a wheel on said spindle, said spindle being positioned intermediate said means and the end of said saddle adjacent said end of said spring which is movably connected with said frame, whereby downward movement of said first mentioned end of said spring, caused by weight on said frame, is adapted to cause a portion of the normal saddle contacting surface of said spring to leave contact with said saddle, and recontacting of said spring with said saddle is adapted to act as a snubber and retard quick upward movement of said first mentioned end of said spring, said means being adjustable with respect to said saddle and said first mentioned end of said spring, whereby the length of said spring which bends under load may be increased and decreased.

2. A trailer having a frame, a pair of one-quarter elliptic springs having their rear ends shackled to the rear of said frame, saddles on said springs, means fixing said saddles to said springs, spindles connected with said saddles, said spindles being positioned intermediate said means and the rear of said saddles, and wheels on said spindles, said means being adjustable with respect to the distance from said rear of said saddles to vary the effective length of said springs.

3. A trailer having a frame, a pair of springs having their rear ends shackled to the rear of said frame, means fixing said saddles to the front ends of said springs, said saddles being pivotally connected with said frame, wheel spindles mounted in said saddles, said spindles being positioned intermediate said means and the rear ends of said saddles, and wheels on said spindles, whereby upward movement of said springs is retarded by contact of said springs with the rear ends of said saddles.

4. A motor vehicle trailer comprising a chassis having front and rear transverse cross members and a transverse axle tube, and longitudinal side members, a body fixed to said transverse and longitudinal members, a pair of springs having their rear ends connected with said rear cross member, longitudinal saddles on said springs, means fixing said saddles to said springs, wheel spindles fixed to the rear ends of said saddles, said spindles being positioned outwardly of the outer surfaces of the sides of said body, whereby said body is permitted to move vertically without interference of said spindles, wheels rotatably mounted on the outer ends of said spindles, studs fixed to said saddles, the inner ends of said studs being rotatably mounted in the ends of said axle tube, a stay bolt having its inner ends threaded to the inner ends of said studs whereby said studs are retained in normal operative position and differential oscillation occurs between said studs and said stay bolt, said spindles being positioned intermediate said means and the rear ends of said saddles.

5. A motor vehicle trailer comprising a chassis having front and rear transverse cross members and a transverse axle tube, and longitudinal side members, a body fixed to said transverse and longitudinal members, a pair of springs having their rear ends connected with said rear cross member, longitudinal saddles on said springs, means fixing said saddles to said springs, wheel spindles fixed to said saddles, said spindles being positioned outwardly of the outer surfaces of the sides of said body, whereby said body is permitted to move vertically without interference of said spindles, wheels rotatably mounted on the outer ends of said spindles, studs fixed to said saddles, the inner ends of said studs being rotatably mounted in the ends of said axle tube, a stay bolt having its inner ends rotatably connected with the inner ends of said studs whereby said studs are retained in normal operative position and differential oscillation occurs between said studs and said stay bolt, said spindles being positioned intermediate said means and the rear ends of said saddles.

6. A motor vehicle trailer comprising a chassis having front and rear transverse cross members and a transverse axle tube, and longitudinal side members, a pair of springs having their rear ends connected with said rear cross member, longitudinal saddles on said springs, means fixing said saddles to said springs, wheel spindles fixed to said saddles, wheels rotatably mounted on said spindles, studs fixed to said saddles, the inner ends of said studs being rotatably mounted in the ends of said axle tube, a stay bolt having its inner ends threaded to the inner ends of said studs whereby said studs are retained in normal operative position and differential oscillation occurs between said studs and said stay bolt, said spindles being positioned intermediate said means and the rear ends of said saddles.

7. A trailer having a frame having a tubular cross member, a pair of springs having their rear ends shackled to the rear of said frame, studs rotatably mounted in said cross member and having their inner ends spaced apart, saddles on said springs and being fixed to said studs, means fixing said saddles to said springs, a stay bolt having its inner ends threaded to the inner ends of said studs whereby said studs are retained in normal operative position and differential oscillation occurs between said studs and said stay bolt, spindles connected with said saddles, and wheels on said spindles.

8. A trailer having a frame having a tubular cross member, a pair of one-quarter elliptic springs having their rear ends shackled to the rear of said frame, studs rotatably mounted in said cross member and having their inner ends spaced apart, a stay bolt in said member and having its ends threaded to said inner ends of said studs whereby longitudinal movement of said studs is prevented, saddles on said springs and being fixed to said studs, means fixing said saddles to said springs, spindles connected with said saddles, said spindles being positioned intermediate said means and the rear of said saddles, and wheels on said spindles, said means being adjustable with respect to the distance from said rear of said saddles to vary the effective length of said springs.

9. A trailer having a frame, a cross member in said frame, a pair of springs having their rear ends connected with said frame, studs mounted in outer ends of said cross member and having spaced apart inner ends, saddles on said springs, means fixing said saddles to said springs, spindles connected with said saddles and having wheels thereon, and means connecting the inner ends of said studs and adapted to permit oscillatory movement of said studs and prevent longitudinal movement of said studs.

RAY F. KUNS.